United States Patent [11] 3,543,636

| | | | |
|---|---|---|---|
| [72] | Inventor | Donald L. Tracy |
| | | 255 Deerwood Drive, Ukiah, California 95482 |
| [21] | Appl. No. | 721,026 |
| [22] | Filed | April 12, 1968 |
| [45] | Patented | Dec. 1, 1970 |

[54] PATTERN DUPLICATING APPARATUS
9 Claims, 7 Drawing Figs.

[52] U.S. Cl. .................................................. 90/13.2, 90/13.7, 144/144
[51] Int. Cl. .................................................. B23c 1/16
[50] Field of Search ........................................ 90/13, 13.1, 13.2, 13.5, 13.8, 24.3, 38, 42, 13.7; 144/144

[56] References Cited
UNITED STATES PATENTS

| | | | |
|---|---|---|---|
| Re. 21,544 | 8/1940 | Richard ........................ | 90/13.5 |
| 447,796 | 3/1891 | Smith et al. ................... | 90/13.2 |
| 888,041 | 5/1908 | Salo .............................. | 90/13.3 |
| 1,775,963 | 9/1930 | McCarroll ..................... | 90/38 |
| 2,366,200 | 1/1945 | Langhorst ..................... | 90/13.2 |
| 2,511,956 | 6/1950 | Wetzel .......................... | 90/13.5 |

FOREIGN PATENTS

| | | | |
|---|---|---|---|
| 254,791 | 7/1926 | Great Britain ................ | 90/13.2 |
| 516,757 | 2/1955 | Italy .............................. | 90/13.5 |

Primary Examiner—Gerald A. Dost
Attorney—Townsend and Townsend

ABSTRACT: A three-dimensional pattern duplicating apparatus including a carriage mounted for to-and-fro movement across the surface of a pattern and blank. The carriage includes a pivotally mounted guide and rotary cutter. As the guide is moved along a linear segment of the surface indentations in the pattern length, the cutter produces corresponding indentations in the blank. Means are also provided to produce periodic incremental advancement of the guide and rotary cutter relative to the width of the pattern.

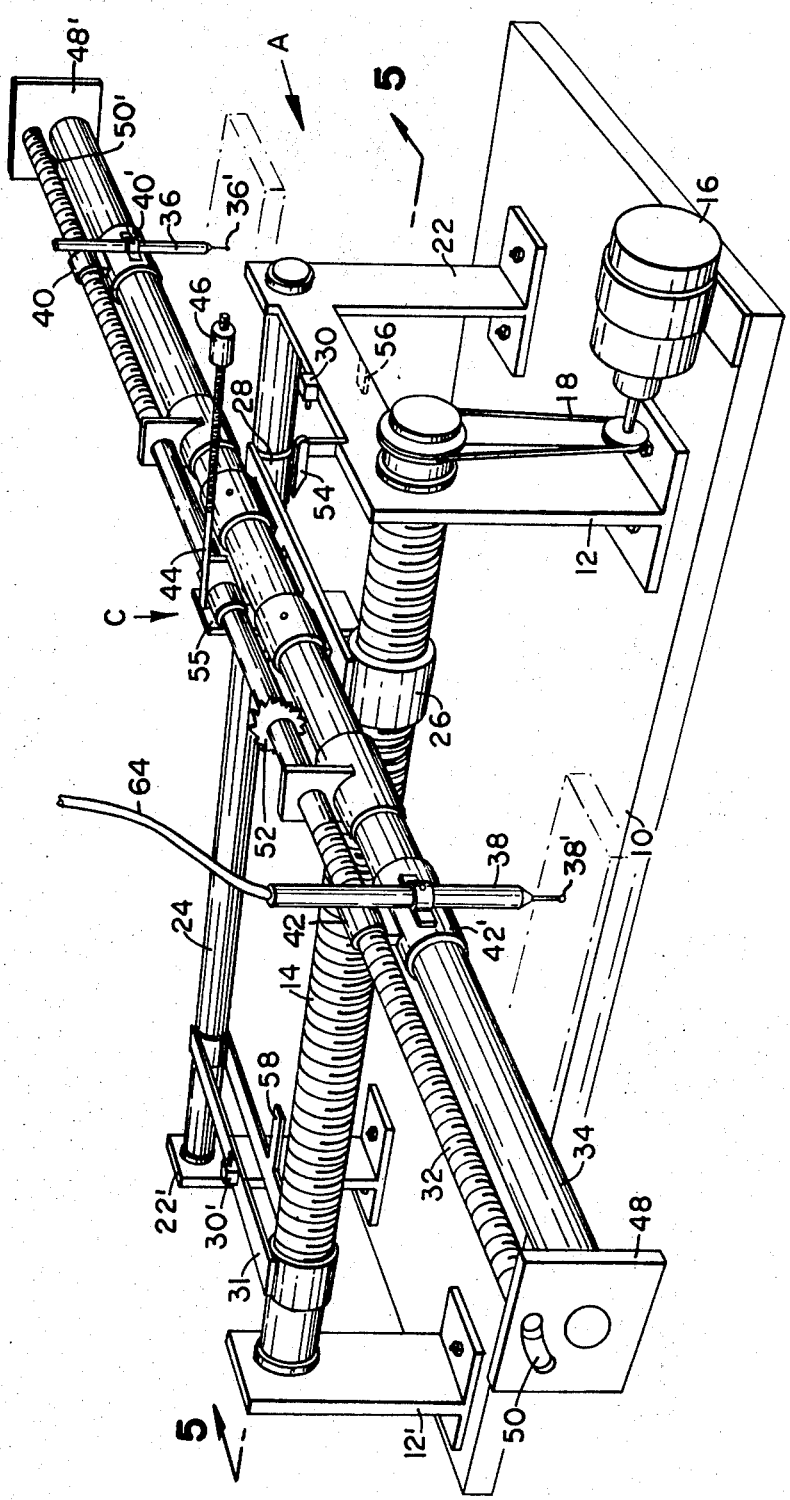
FIG_1
INVENTOR.
DONALD L. TRACY

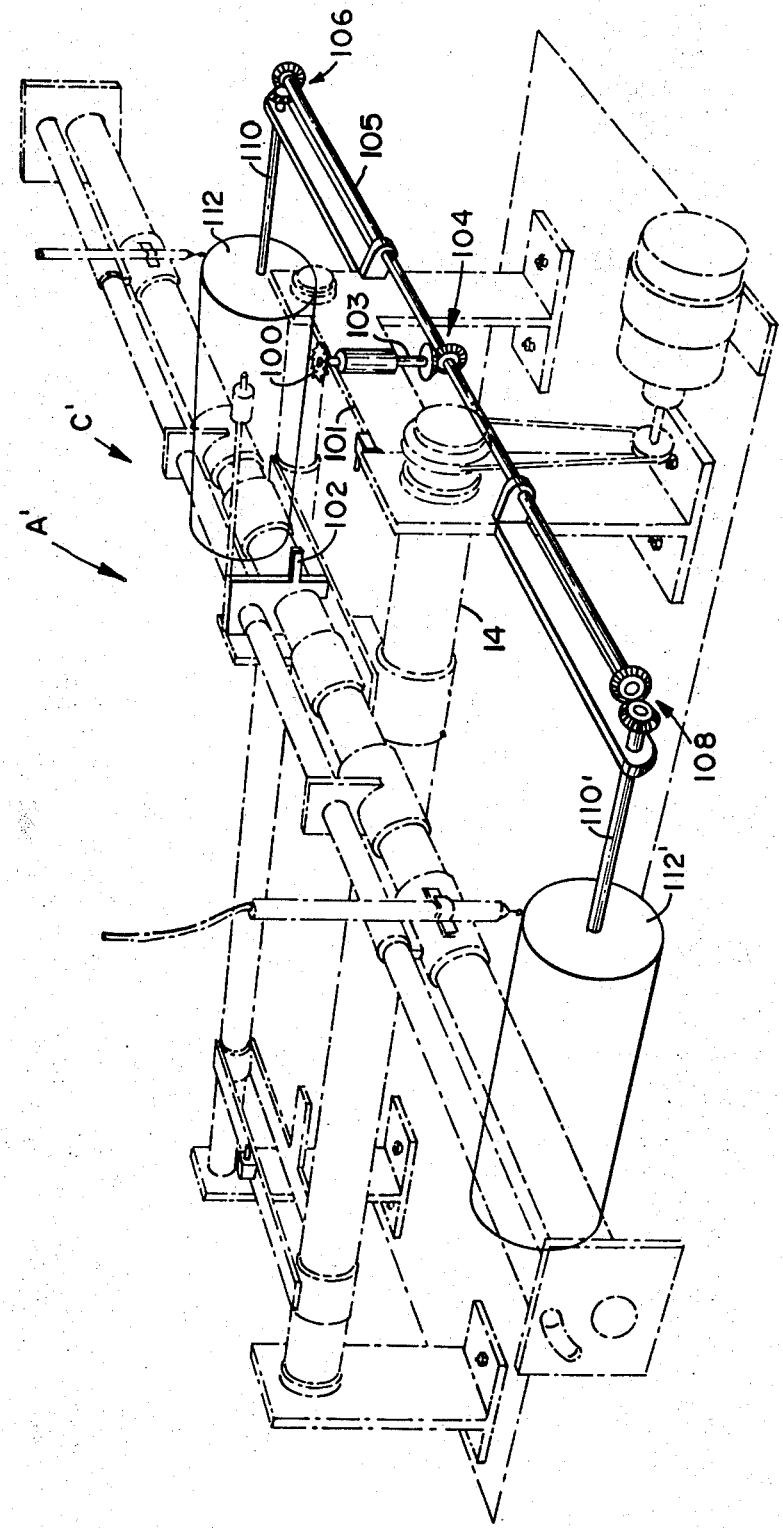

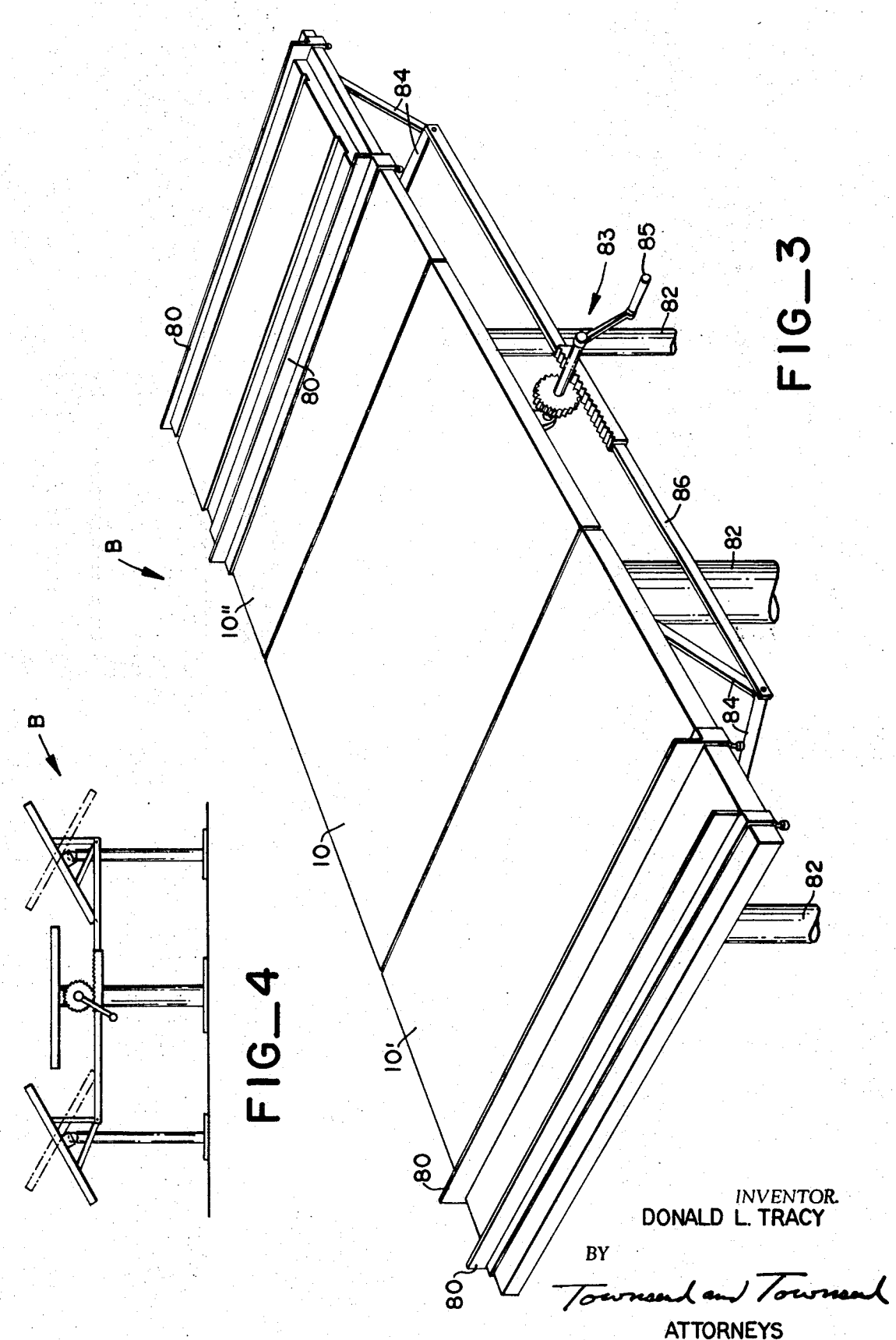

Patented Dec. 1, 1970
3,543,636
Sheet 4 of 4
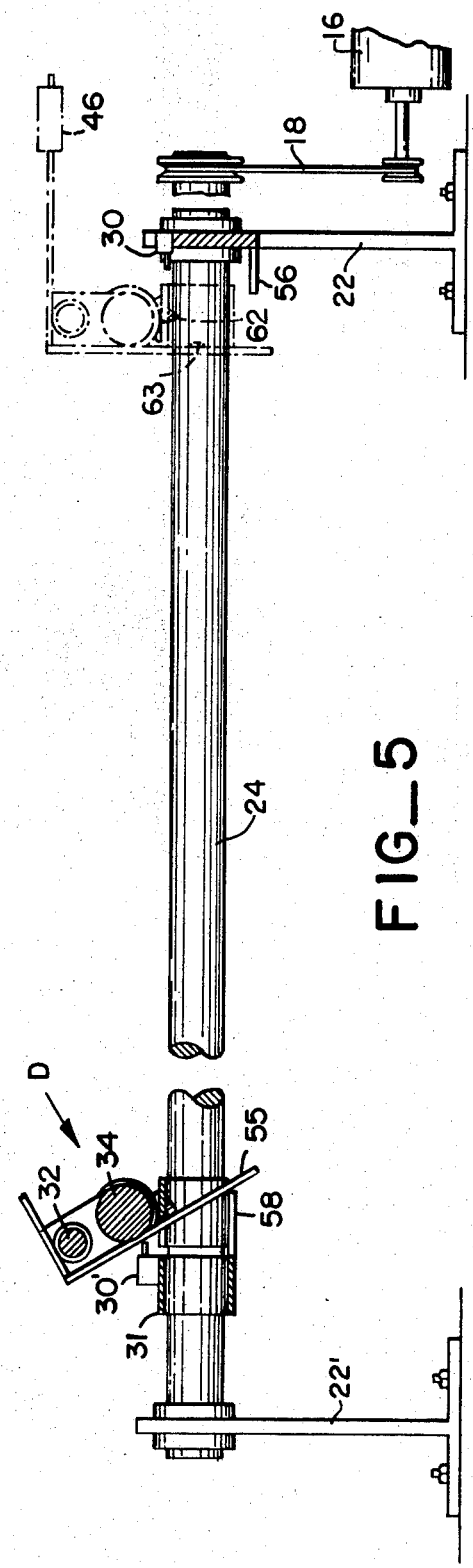
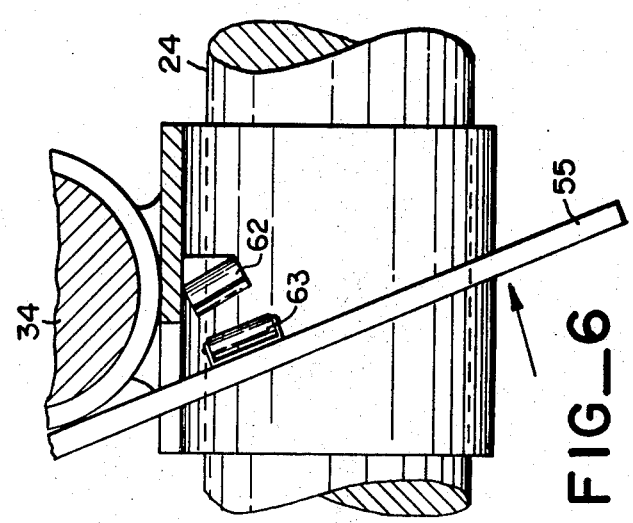
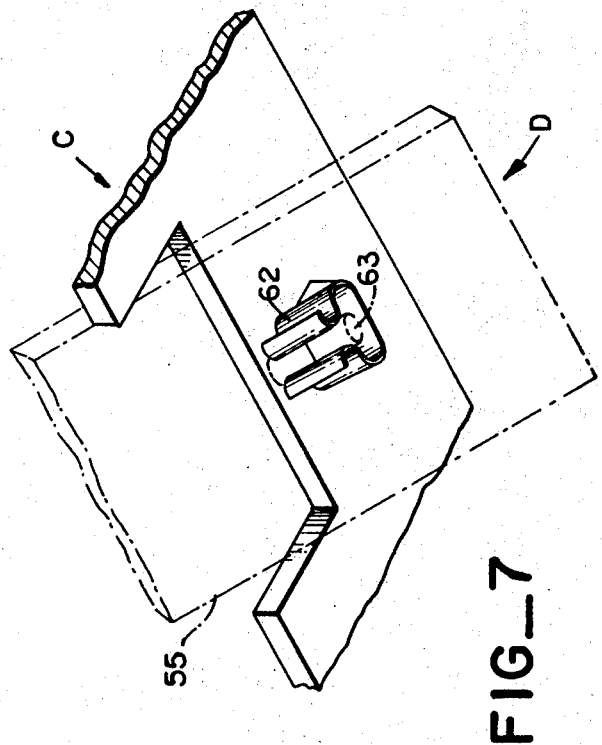
INVENTOR.
DONALD L. TRACY
BY
Townsend and Townsend
ATTORNEYS

PATTERN DUPLICATING APPARATUS

This invention relates to a device for tracing a pattern while simultaneously forming a corresponding surface configuration on a blank. More particularly, the invention is directed to apparatus for duplicating a three-dimensional object through the use of a simple yet accurate device.

Although a number of forms of three-dimensional reproduction apparatus have been developed, all are of an extremely complex nature involving extensive electrical and/or hydraulic components to provide the necessary duplicating capability. Thus a longfelt need exists for an efficient, accurate and economical means for reproducing a spatial pattern having variations along the X, Y and Z axes.

It is therefore a principal object of this invention to provide a novel duplicating device for producing three-dimensional forms by removing material from a solid block so that the remaining material in the block represents the desired three-dimensional configuration of a pattern.

It is a further object of this invention to trace the three-dimensional contours of a pattern by the stepwise crisscross advancement of a pivotally mounted, rotary cutting tool.

It is still a further object of this invention to utilize a supporting table suitable for the simultaneous positioning of a pattern and a blank with respect to a tracing head and cutting tool.

It is another object of this invention to provide an apparatus for duplicating cylindrical objects.

These objects of the invention will be better understood and other objects, features and advantages will become apparent when reference is made to the following detailed description especially in view of the attached drawing, wherein:

FIG. 1 is a perspective view illustrating one embodiment of this invention;

FIG. 2 is a second embodiment suitable for the duplication of cylindrical objects;

FIG. 3 is a perspective view of a three-part supporting table for use with the device illustrated in FIGS. 1 and 2;

FIG. 4 is a schematic side elevational view partially in phantom showing the operation of the table of FIG. 3;

FIG. 5 is a cross-sectional view taken along line 5-5 of FIG. 1;

FIG. 6 is a fragmentary enlargement illustrating the locking means approaching the closed position as shown on FIG. 5; and FIG. 7 is a perspective view of the fragmentary enlargement illustrated in FIG. 6 in a locked position.

Referring now to the drawing wherein similar characters of reference represent corresponding parts in each of the several views, in FIG. 1 duplicating assembly A is shown disposed on the center panel 10 of support table B (described in more detail with reference to FIG. 3). Assembly A includes a pair of horizontally spaced upright frame members 12 and 12' secured to center panel 10 in some conventional manner such as by bolting or welding. Frame members 12 and 12' support therebetween on conventional bearing blocks, carriage lead screw 14 for rotation about its axis. Lead screw 14 is attached to motor 16 via pulley belt 18 to provide screw 14 with the desired rotational movement. Frame members 22 and 22', also secured to panel 10 in a conventional manner, are spaced from frame members 12 and 12' and rigidly support therebetween an elongated guide member 24 in parallel alinement with lead screw 14. Guide member 24 may be of any suitable cross section such as circular. Members 12 and 22 may be of unitary construction.

Carriage C is movably mounted on lead screw 14 and in sliding contact with guide member 24 through internally threaded collar 26 and nonthreaded collar 28. Thus, it will be seen that as lead screw 14 is rotated, carriage C is moved to-and-fro along the length of the frame (along the X-X-axis). The extent of movement of carriage C, to be described in greater detail infra, is controlled by a pair of limit switches 30 and 30' that reverse the direction of motor 16 at appropriate intervals when engaged by alined portions of carriage C. Limit switch 30 is positioned at the right side of assembly A preferably by frame member 12, while limit switch 30' is positioned on movable crossbar 31. Crossbar 31 can be manually positioned along lead screw 14 and guide member 24 so as to define the desired extent of traversal of carriage C along lead screw 14. Crossbar 31 is releasably attached to lead screw 14 and guide member 24 in any conventional manner such as by a set screw (not shown).

Carriage C includes tracing head lead screw 32 and tracing head guide member 34, preferably alined perpendicular to lead screw 14 and guide member 24, for supporting tracing head assembly 36 and rotary cutter assembly 38. Tracing head assembly 36 and rotary cutter assembly 38 are preferably disposed to retain tracing head 36' and cutter 38' perpendicular to lead screw 14 and guide member 24. It will be apparent to one skilled in this art that various means can be employed to provide for individual adjustment of the height of tracing head 36' and cutter 38' with respect to the pattern and workpiece, respectively. Furthermore, guide member 34 must be rigidly secured to threaded collar 26 and nonthreaded collar 28 such as by set screws (not shown).

Tracing head assembly 36 and rotary cutter assembly 38 are attached to lead screw 32 through respective of internally threaded collars 40 and 42. Tracing head lead screw 32 is provided with appropriately spaced threaded segments to cooperate with threaded collars 40 and 42 for the simultaneous positioning of tracing head assembly 36 and cutter assembly 38 along screw 32. Tracing head assembly 36 and cutter assembly 38 are further provided with collars 40' and 42' that provide sliding engagement and support with tracing head guide member 34. Thus, tracing head assembly 36 and rotary cutter assembly 38 are movable in a direction normal to the direction of advancement of carriage C by rotation of tracing head lead screw 32 (along the Y-Y-axis) as described infra.

Ratchet 52 is supported by carriage C along screw member 32 and alined for contacting trip bar 54 attached to frame member 12, when carriage C is conveyed to the end of screw 14 nearest frame member 12. In this manner, rotation of ratchet 52 will produce incremental movement of tracing head assembly 36 and cutter assembly 38 along the Y-Y-axis on a path defined by tracing head lead screw 32 and tracing head guide member 34.

To provide for movement of tracing head assembly 36 and cutter assembly 38 in a vertical direction corresponding to surface indentations in the pattern, (in the Z-Z-axis), tracing head assembly 36 and rotary cutter assembly 38 are pivotally mounted about the axis of tracing head guide member 34. Tracing head guide member 34 is provided with end plates 48 and 48' that include arcuate apertures 50 and 50', respectively, for defining the limits of pivotal movement of tracing head lead screw 32 about the axis of member 34.

Arm 44, supporting threadably movable counterweight 46, is secured to carriage C to urge tracing head lead screw 32 in a clockwise direction about the axis of tracing head guide member 34. Counterweight 46 is in threaded engagement with arm 44 so that weight 46 can be positioned at different locations along arm 44 to provide various amounts of working pressure depending upon the particular type of pattern being modified. In this manner, tracing head 36' and rotary cutter 38' can be directed against respective of the pattern and blank with a force than can be varied according to the hardness of the material from which the blank is formed. Through proper location of arcuate apertures 50 and 50', the rotational movement of tracing head lead screw 32 will be limited so that tracing head assembly 36 and rotary cutter assembly 38 will occupy a vertical position at one extreme of apertures 50 and 50' and an angular position out of contact with the pattern and blank at the other extreme.

It has been found that the apparatus of this invention is most effective when the tracing and cutting operation is conducted in one direction, i.e., as carriage C passes from right to left. To prevent contact of head assembly 36 and rotary cutter assembly 38 during movement of carriage C from left to right, (returning carriage C to the starting position), carriage C is provided with a vertical-positioning plate 55. Rigidly secured to crossbar is angular positioning arm 58. As carriage C traverses lead screw 14, limit switch 30' will engage positioning plate 55 integral with carriage C. However, prior to this contact positioning plate 55 abuts positioning arm 58 and produces pivotal movement of assembly C about the axis of tracing head guide member 34. In this manner tracing head assembly 36 and rotary cutter assembly 38 will be pivoted out of contact with respective of the pattern and blank.

In a preferred embodiment and as most clearly shown in FIGS. 5–7, the side of positioning plate 55 opposite arm 58 includes rotatably mounted roller 63 disposed for interlocking meshing with locking clip 62 attached to the base of carriage C. Thus, as carriage C advances along lead screw 14 and into contact with angularly positioning arm 58, the upper portion of carriage C will be caused to pivot about the axis of tracing head guide member 34, to produce interlocking of roller 63 and locking clip 62. In this way, adjustable tracing head 36 and adjustable rotary cutter assembly 38 are retained out of contact with respective of the pattern and blank. When carriage C has been returned to the starting end of screw 14 as a result of reversal of motor 16, the obverse side of plate 55 will engage vertically alining arm 56. Continued return of assembly C toward frame member 12 disengages roller 63 from clip 62. In this manner, assembly C will pivot about the axis of guide member 34 in a counterclockwise direction, thereby returning tracing head assembly 36 and adjustable rotary-cutting assembly 38 to a vertical position corresponding to the Z–Z-axis. As this vertical position is attained, limit switch 30 is engaged, again causing reversal of direction of motor 16. Simultaneously therewith, ratchet 52 is engaged by trip lever 54 to rotate-tracing lead screw 32, thereby simultaneously advancing tracing head assembly 36 and rotary cutter assembly 38 incrementally along the Y–Y-axis.

In operation, a pattern to be duplicated (shown in phantom) is positioned to be contacted by tracing head 36' in assembly 36. A blank (also shown in phantom) having an upper surface to be conformed to the pattern is similarly disposed with respect to rotary cutter assembly 38. Cutter 38' is connected to a flexible shaft 64 for supplying rotary power thereto from a conventional source (not shown). Motor 16 is started, causing rotation of carriage lead screw 14 to advance carriage C from left to right between frame member support 12 and crossbar 31. During this advancement of carriage C along the X–X-axis, cutter 38' is being moved into and out of the blank in a manner corresponding to the movement of tracing head 36'. Thus, rotary cutter 38' forms an elongated indentation in the blank corresponding to that particular surface portion of the pattern disposed under tracing head 36'.

When carriage C has traversed lead screw 14 to the point of physical contact of plate 55 with arm 58, further advancement of carriage C produces rotation thereof about the axis of guide member 34 and interlocking of members 62 and 63. At the completion of this locking engagement, limit switch 30' is engaged to reverse the direction of motor 16, thereby reversing the movement of carriage C. In this manner, carriage C is returned along screw 14 to its starting position.

Just prior to abutting vertical support 12, carriage C engages arm 56 to cause disengagement of members 62 and 63 and return carriage C to its normal upright position. Continued return of carriage C causes engagement with limit switch 30, again reversing the direction of motor 16 and starting another traverse along screw 32. Simultaneously, with the engagement of limit switch 30, trip arm 54 contacts ratchet 52 to advance-tracing head assembly 36 and rotary cutter assembly 38 in incremental distance along the Y–Y-axis, i.e., parallel to lead screw 32. The extent of advancement of tracing head assembly 36 and rotary cutter assembly 38 preferably corresponds to about the width of the cutting surface of rotary cutter 38' so that continued movement of carriage C back and forth along screw 14 will produce a series of overlapping and interrelated cuts in the blank that correspond in surface contour to the surface of the pattern. It will be apparent that an off-switch can be attached at about frame member 22 to terminate the movement of carriage C when all of the pattern has been duplicated.

Turning now to FIGS. 3 and 4 wherein support table B is shown in more detail, there is included center panel 10 for supporting assembly A. Adjacent to panel 10 are side panels 10' and 10'', each having adjustable work holders 80 for engaging the pattern and blank to maintain them in a rigid position with respect to each other during the duplicating operation. Panels 10' and 10'' are supported on vertical posts 82 for pivotal movement about the top thereof. Rack and pinion 83, movable with handle 85, provides for adjustment of pivot arms 84 to simultaneously modify the position of panels 10' and 10''. Thus, manual movement of handle 85 tilts panels 10' and 10'', as shown most clearly in full and in phantom in FIG. 4.

Referring to FIG. 2, there is shown a second embodiment of this invention suitable for duplicating a cylindrical pattern. For purposes of clarity, those portions of assembly A described with reference to FIG. 1 are shown in phantom. Only those aspects of the assembly A' that are required to accomplish the duplicating on the cylindrical pattern are illustrated in full.

Here again the to-and-fro movement of carriage C along screw 14 produces the desired cutting of the cylindrical blank. However, trip lever 54, normally disposed for engagement with ratchet 52 has been displaced. In its stead, assembly A' includes a ratchet 100 mounted on crossbar 101 between frame members 12 and 22. Trip lever 102 carried by carriage C' engages ratchet 100 when carriage C' is returned to the right-hand end of assembly A'. Movement of ratchet 100 produces rotation of cylindrical pattern 112 and cylindrical blank 112' through bevel gear units 104, 106 and 108.

In operation, rotation of ratchet 100 causes corresponding rotation of shaft 103 and level gear unit 104, which in turn rotates shaft 105 and a pair of level gear units 106 and 108, that in turn rotate shafts 110 and 110' to cause corresponding rotation of the pattern and blank. Thus as carriage C is advanced to-and-fro along carriage lead screw 14, ratchet 100 will be periodically advanced to provide the desired amount of rotational movement of the blank and pattern so that progressive contouring will be accomplished.

It will be apparent to one skilled in this art that the diameter of cutter 38' guide 36' can be varied depending upon the detail desired in the duplicated pattern. Furthermore, the duplicating can be accomplished in various materials including but not limited to wood, plastic, metal and the like.

Although the foregoing invention has been described in some detail by way of illustration for purposes of clarity of understanding, it will be apparent to one skilled in this art that certain changes and modifications may be practiced within the spirit of this invention as limited only by the scope of the appended claims.

I claim:

1. An automated pattern-duplicating assembly comprising a carriage for supporting tracing means and cutting means relative to a single pattern and blank with their respective axes in parallel alinement, said carriage including means for simultaneously advancing said tracing means and cutting means from a starting position in a first direction parallel to said pattern and blank while accomplishing respective tracing and cutting operations upon said pattern and blank; means mounted on said carriage for pivoting said tracing means and cutting means about an axis perpendicular to said first direction to enable said tracer means to trace the indentations in said pattern and enable said cutting means to produce similar indentations in said blank; means for terminating said advancement in said first direction at a second position; means for reversing the direction of said advancement and returning said carriage to said starting position; means for retaining said cutting means out of contact with said pattern and blank during said direction reversal; means for incrementally advancing said tracing means and said cutting means in a second direction for a distance corresponding to about the width of said cutting means relative to said pattern and blank prior to repeated advancement in said first direction; and means for driving said cutting means during said repeated advancement so that said pattern will be duplicated on said blank.

2. A pattern-duplicating assembly in accordance with claim 1 wherein said incremental advancement means comprises means for repeatedly incrementally advancing said cutting means and said tracing means transverse to said first direction.

3. A pattern-duplicating assembly in accordance with claim 2 wherein said means for incrementally advancing said tracing means and cutting means in a second direction is a ratchet engageable with a trip member when said carriage is disposed at said starting portion.

4. A pattern-duplicating assembly in accordance with claim 1 wherein said pattern and blank are cylindrical and incremental advancement means comprises means for simultaneously rotating said blank and said pattern about their respective axes.

5. A pattern-duplicating assembly in accordance with claim 1 wherein said tracing means and said cutting means are adjustably supported in a vertical plane.

6. A pattern-duplicating assembly in accordance with claim 1 and further comprising a three-section table having a center section for supporting said assembly and a pair of adjustable outer sections for correspondingly supporting said blank and said pattern.

7. A pattern-duplicating assembly in accordance with claim 1 wherein said means for simultaneously advancing said tracing means and cutting means and said means for reversing the direction of said advancement are a single reversible motor.

8. A pattern-duplicating assembly in accordance with claim 1 wherein said cutting means is a vertically mounted rotary drill.

9. A method for duplicating the surface contour of a pattern on a blank, comprising the steps of:
   A. Providing a spaced, interconnected, pivotally mounted tracing means and cutting means;
   B. Positioning said tracing means and cutting means in contact with the respective surfaces of said pattern and blank at a first location;
   C. Passing said tracing means from said first location along a linear portion of the surface of said pattern to a second location so that the path transcribed by said tracing means will define the surface contour of said pattern;
   D. Transmitting the impulse of the passage of said tracing means to said cutting means to cause said cutting means to form a similar linear surface contour in said blank;
   E. Returning said tracing means and said cutting means to said first location while retaining them out of contact with said pattern and said blank, respectively;
   F. Moving each of said tracing means and said cutting means in a direction substantially perpendicular to said linear portion for an incremental distance corresponding to up to the width of said linear portion; and
   G. Repeating steps B–F until the surface contour of said pattern is reproduced on said blank.